US012753786B2

(12) United States Patent
Mills

(10) Patent No.: US 12,753,786 B2
(45) Date of Patent: Oct. 6, 2026

(54) FASTENER FOR USE WITH ULTRAVIOLET LIGHT SENSITIVE ADHESIVE

(71) Applicant: The Boeing Company, Arlington, VA (US)

(72) Inventor: Christopher John Mills, Charleston, SC (US)

(73) Assignee: THE BOEING COMPANY, Arlington, VA (US)

( * ) Notice: Subject to any disclaimer, the term of this patent is extended or adjusted under 35 U.S.C. 154(b) by 219 days.

(21) Appl. No.: 18/484,709

(22) Filed: Oct. 11, 2023

(65) Prior Publication Data

US 2025/0122898 A1 Apr. 17, 2025

(51) Int. Cl.
*F16B 11/00* (2006.01)
*F16B 37/12* (2006.01)

(52) U.S. Cl.
CPC ........... *F16B 11/006* (2013.01); *F16B 37/122* (2013.01); *F16B 2200/50* (2018.08)

(58) Field of Classification Search
CPC ...... F16B 11/006; F16B 37/12; F16B 37/122; F16B 5/0208; F16B 37/048; B29C 65/4845; B29C 2035/0827; B32B 2037/1253
See application file for complete search history.

(56) References Cited

U.S. PATENT DOCUMENTS

| | | | | |
|---|---|---|---|---|
| 6,139,237 | A * | 10/2000 | Nagayama | F16B 37/048 411/181 |
| 10,400,806 | B2 * | 9/2019 | Drüke | F16B 19/00 |
| 10,456,988 | B2 | 10/2019 | Iwano | |
| 2020/0096036 | A1 * | 3/2020 | Stumpf | B29C 65/08 |

FOREIGN PATENT DOCUMENTS

JP 6428725 B2 11/2018

OTHER PUBLICATIONS

EP Search Report mailed Mar. 3, 2025 in re EP Application No. 24203403.1.
Böllhoff, "Onsert®", Retrieved from the internet: URL: https://www.boellhoff.com/us-en/products/special-fasteners/onsert-adhesive-bonding-of-fasteners/ [retrieved on Oct. 11, 2023]; pp. 1-5.

* cited by examiner

*Primary Examiner* — Carson Gross
(74) *Attorney, Agent, or Firm* — COATS & BENNETT, PLLC

(57) ABSTRACT

A fastener configured to be attached to a panel and to support an item. The fastener has a body constructed from a first material and with the body having an opening that extends into the body at a first end. A flange constructed from a second material is connected to the body and sized to extend laterally outward beyond the body. The first material has a higher melting point than the second material. The first material has a lower transmissibility of UV light than the second material.

20 Claims, 6 Drawing Sheets

FASTENER FOR USE WITH ULTRAVIOLET LIGHT SENSITIVE ADHESIVE

TECHNOLOGICAL FIELD

The present disclosure relates generally to the field of fasteners and, more specifically, to fasteners comprising a body and a flange constructed from different materials and configured to use with an UV adhesive.

BACKGROUND

Items are traditionally attached to panels within vehicle interiors with potted fasteners. The fasteners are placed into a hole in the panel and then potting (i.e., adhesive) is injected. Once secured, an item can be attached to the fastener to secure the item to the panel. Potted fasteners typically have an internally threaded feature and provide a simple and strong way to attach the item to the panel. However, existing potted inserts have a variety of drawbacks.

Attempts to automate the installation process have proven to be difficult and expensive. Therefore, the potted fasteners are manually installed in most applications. The manual installation requires a technician to individually insert each of the fasteners into the panels. An issue with manual installation is the inconsistency in the installation. This can result in the fasteners failing quality specifications.

Another issue with existing fasteners is the relatively long time required for adhesive curing. In some examples, the cure time of the potting is four hours which greatly adds to the overall cycle times of the installation.

SUMMARY

One aspect is directed to a fastener configured to be attached to a panel and to support an item. The fastener comprises a body constructed from a first material and with the body comprising an opening that extends into the body at a first end. A flange constructed from a second material is connected to the body and sized to extend laterally outward beyond the body. The first material comprises a higher melting point than the second material. The first material comprises a lower transmissibility of UV light than the second material.

In another aspect, the flange is connected to a second end of the body and is spaced away from the first end of the body.

In another aspect, the first material comprises a higher strength than the second material.

In another aspect, the flange comprises a central opening and the body is positioned within the central opening.

In another aspect, an insert is positioned within the opening of the body at the first end with the insert constructed from a third material that is different from the first material and the second material.

In another aspect, the body comprises grooves on opposing sides of the opening to crimp the insert.

In another aspect, the body comprises a main section that comprises the first end, and a lip positioned at the second end wherein the lip comprises a greater width than the main section.

In another aspect, the opening in the body extends completely through the body.

In another aspect, the flange is substantially translucent to accommodate transmission of the UV light and the body is opaque.

One aspect is directed to a fastener configured to be attached to a panel and to support an item. The fastener comprises a body comprising a first end, a second end, and an opening that extends through the body from the first end to the second end. A flange is positioned at the second end of the body and comprises a width that is greater than the body with the flange extending laterally outward beyond the body. The body has a higher melting point and a lower transmissibility of UV light than the flange.

In another aspect, the flange is translucent and the body is opaque.

In another aspect, the body comprises a cylindrical shape and the flange comprises a disc shape.

In another aspect, the flange extends completely around the body.

In another aspect, the flange comprises a central opening and the second end of the body is positioned within the central opening.

In another aspect, an insert is positioned within the opening in the body with the insert constructed from a different material than each of the body and the flange.

In another aspect, the body comprises a main section that extends inward from the first end with the main section having a first width, and a lip positioned at the second end with the lip having a second width that is greater than the first width.

One aspect is directed to a method of attaching a fastener to a panel. The method comprises: positioning an opaque body of the fastener into an opening in the panel with a first end of the body at a first side of the panel and a second end of the body at an opposing second side of the panel; positioning a translucent flange across the opening at the second side of the panel with the translucent flange connected to the second end of the opaque body; positioning adhesive between the translucent flange and the second side of the panel; and securing the fastener to the panel by passing UV light through the translucent flange and to the adhesive and curing the adhesive.

In another aspect, the method further comprises applying the adhesive to the translucent flange prior to positioning the translucent flange across the second side of the panel.

In another aspect, the method further comprises aligning a first end of the opaque body with the first side of the panel.

In another aspect, the method further comprises applying the adhesive to just the translucent flange and not the opaque body.

The features, functions and advantages that have been discussed can be achieved independently in various aspects or may be combined in yet other aspects, further details of which can be seen with reference to the following description and the drawings.

DETAILED DESCRIPTION

Figure 1A:
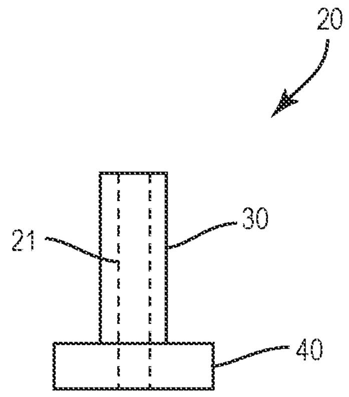
FIG. 1A is a schematic diagram of a fastener having a body and a flange and with an opening extends through both.

FIG. 1A illustrates a fastener 20 configured to connect to a panel. The fastener 20 includes a body 30 and a flange 40. An opening 21 extends into the fastener 20 and can extend partially or completely through the fastener 20. The body 30 is constructed from a first material and the flange 40 is constructed from a different second material. The first material of the body 30 has a higher melting point and a lower transmissibility of UV light than the second material of the flange 40. In some examples, the body 30 is designed for strength to engage with and support an item, and the flange 40 is designed to allow transmission of the UV light to an underlying adhesive and to resist torque of the fastener 20 relative to the panel.

In some examples, the first material of the body 30 is functionally strong and light. In some examples, the first material has a higher melting point than the second material. In some examples, the first material is not formulated based on its transmissibility of UV light.

Figure 1B:
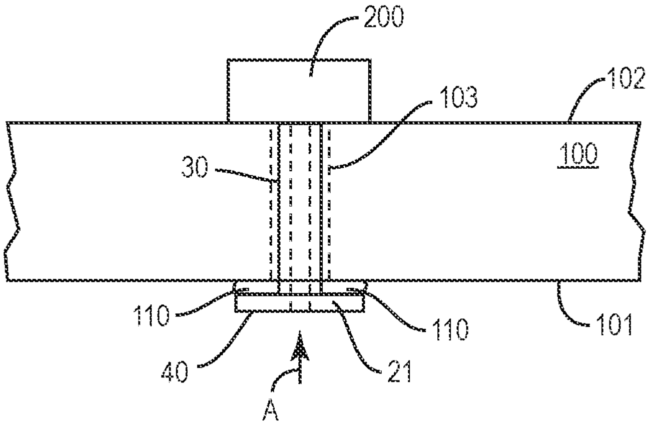
FIG. 1B is a schematic diagram of a fastener mounted in an opening in a panel and with an item attached to the fastener.

FIG. 1B illustrates the fastener 20 mounted within an opening 103 in a panel 100. The fastener 20 is positioned with the body 30 extending through the opening 103 and the flange 40 positioned at a first side 101 of the panel 100. During use, the fastener 20 is inserted into the opening 103 in the direction indicated by arrow A. The flange 40 has a width that is greater than the opening 103 to remain on the first side 101 of the panel 100. The body 30 is sized to extend through the opening 103. A light-curable adhesive 110 positioned at the flange 40 maintains the fastener 20 connected to the panel 100. The flange 40 is a translucent material with high light transmissibility and a lower melting temperature. The body 30 is a high strength, high melting point material with a lower transmissibility of UV light. This construction provides for UV light to pass through the flange 40 to cure the adhesive 110. After the adhesive 110 is cured, the body 30 is configured to connect to an item 200 to connect the item 200 to the panel 100.

Figure 2A:
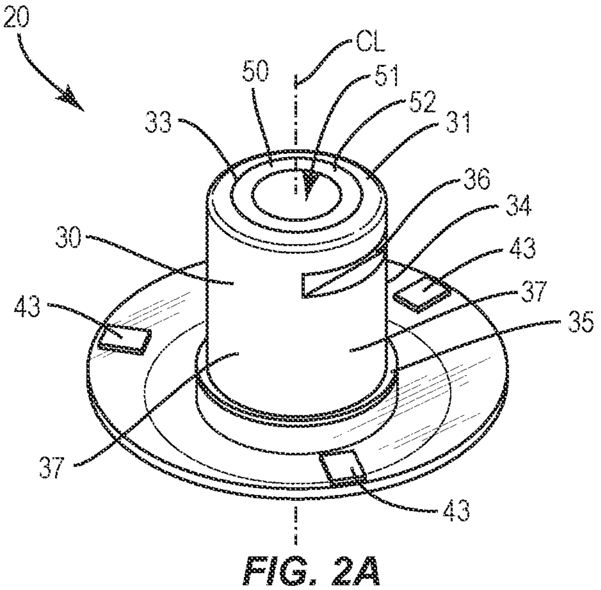
FIG. 2A is an isometric view of a first side of a fastener.
Figure 2B:
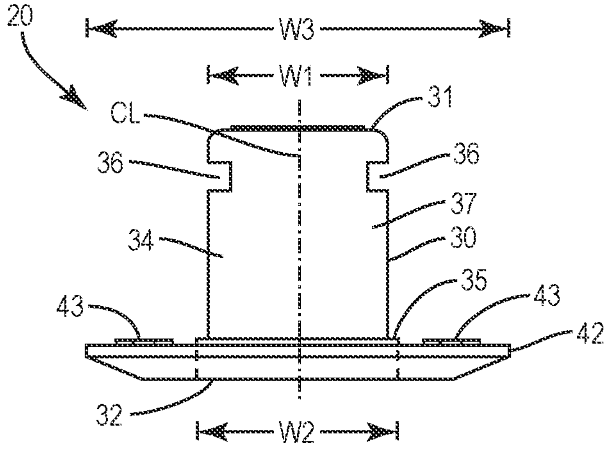
FIG. 2B is a side view of the fastener of FIG. 2A.
Figure 2C:
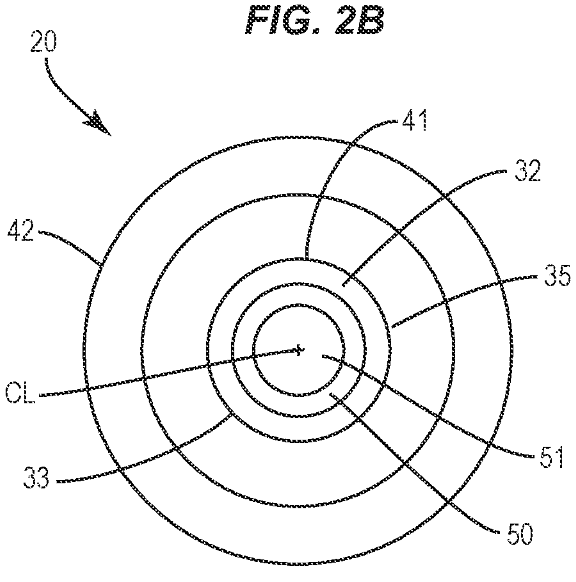
FIG. 2C is an end view of a second side of the fastener of FIG. 2A.

FIGS. 2A, 2B, and 2C illustrate a fastener 20 that includes a body 30 and flange 40. The body 30 and flange 40 are co-axially aligned along a centerline CL of the fastener 20. The body 30 has an elongated shape with a first end 31 and a second end 32 and an outer lateral side 34. In some examples, the edge formed between the first end 31 and the lateral side 34 is rounded to facilitate insertion of the body 30 into the opening 103 in the panel 100. In some examples, the body 30 is cylindrical with a substantially circular sectional shape. In other examples, the body 30 has different shapes.

The body 30 includes an opening 33 that extends inward from the first end 31. In some examples as shown in FIGS. 2A and 2C, the opening 33 extends through the length of the body 30 with second end 32 also being open. In other examples, the opening 33 extends into the first end 31 a limited distance to form a cavity and with the second end 32 being closed. In some examples, the opening 33 includes substantially smooth sides. In other examples, the opening 33 includes threads.

In some examples as illustrated in FIGS. 2A and 2C, an insert 50 is mounted in the opening 33. The insert 50 has a cylindrical shape with a central opening 51 that is co-axially aligned with the body 30. In some examples, the exterior of the insert 50 is threaded to engage with threads along the opening 33. In other examples, the exterior of the insert 50 is substantially smooth. In some examples, the insert 50 is inserted into the opening 33 with a first end 52 aligned with the first end 31 of the body 30. The length of the insert 50 can vary, with one example including the insert 50 being shorter than the body 30 and spaced away from the second end 32. In other examples, the insert 50 extends the entire length of the opening 33.

The insert 50 is a separate member that is inserted into and connected with the body 30. The insert 50 can be connected in various manners, including but not limited to one or more of a threaded engagement, adhesives and being molded together. In some examples, the insert 50 is co-molded with the body 30 and the molten material of the body 30 flows around and secures the insert 50. In other examples, the body 30 includes one or more grooves 36 along the lateral sides 34. The grooves 36 provide for applying a force to crimp the insert 50 to create a distortion and thereby a thread locking feature.

Figure 3:
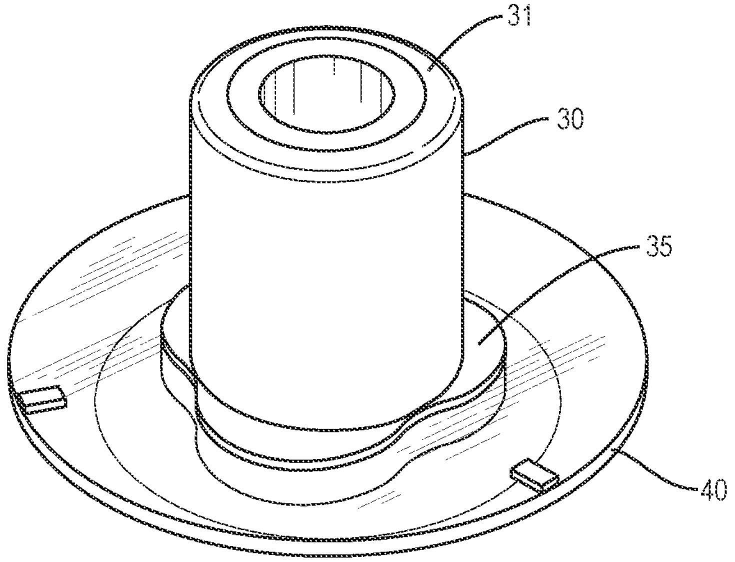
FIG. 3 is an isometric view of a first side of a fastener.

The body 30 includes a main section 37 and a lip 35 at the second end 32. The lip 35 is configured to engage with the flange 40. As illustrated in FIG. 2B, the lip 35 has a width W2 measured between opposing lateral sides that is greater than a width W1 of the main section 37. The lip 35 can include various shapes and sizes, including but not limited to circular as illustrated in FIGS. 2A-2C, polygonal, and non-circular as illustrated in FIG. 3.

The body 30 is constructed from material with a high strength and high melting point. The material further has low light transmissibility. One examples of a material includes polyetherimide which is often referred to by its trade name ULTEM.

The flange 40 is connected to the body 30 at the second end 32. The connection can be through various means including one or more of threaded engagement, adhesive, and being molded together. In some examples, the body 30 and flange 40 are co-molded or over-molded together. In some examples, the flange 40 has a disc shape that extends completely around the body 30.

The flange 40 includes a center opening 41 that receives the body 30. As illustrated in FIG. 2B, the bottom of the flange 40 is aligned with the second end 32 of the body 30. The flange 40 also includes an outer edge 42 that defines the shape. The flange 40 can include various shapes including but not limited to circular as illustrated in FIGS. 2A and 2C, oval, and polygonal. In some examples, the flange 40 has a cupped shape with the outer edge 42 axially offset from the opening 41 along the centerline CL. The cupped shape is configured to receive the adhesive 110. The outer side of the flange 40 can be tapered to provide an aesthetic look (and optimized for weight and strength) and prevent the flange 40 from catching against objects when the fastener 20 is mounted to the panel 100. One or more stand-offs 43 on the inner side extend upward above the outer edge 42. The stand-offs contact against the panel 100 and provide spacing for the adhesive 110.

The flange 40 has a width W3 measured between opposing points on the outer edge 42. The width W3 is larger than the width W1 of the main section 37 of the body 30. This larger size prevents the fastener 20 from being inserted completely into the opening 103 as the flange 40 remains on the first side 101 of the panel 100.

The flange 40 is constructed from a translucent material with a high light transmissibility. The material also has a lower melting temperature than the body 30. Examples of materials include but are not limited to transparent nylon, transparent polyamides, and TROGAMID material.

Figure 4A:
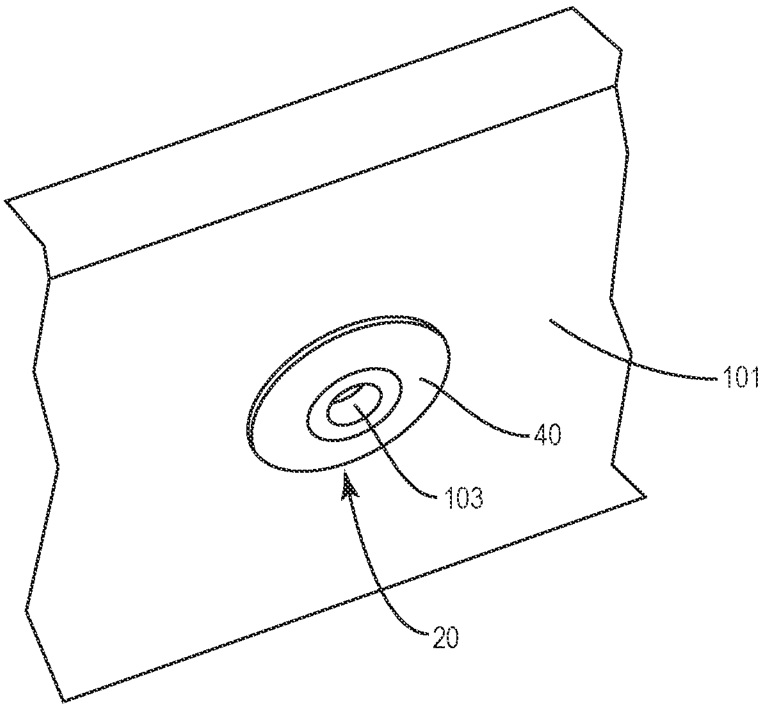
FIG. 4A is an isometric view of a fastener connected to a first side of a panel.
Figure 4B:
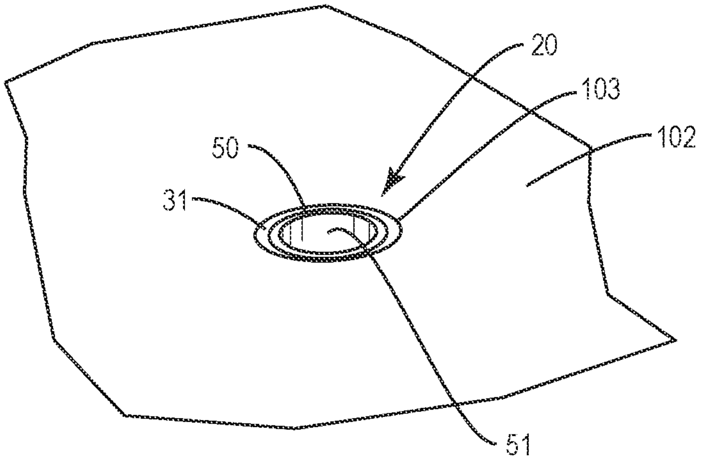
FIG. 4B is an isometric view of the fastener of FIG. 4A on a second side of the panel.

FIGS. 4A and 4B illustrate the fastener 20 connected to the panel 100. The flange 40 is positioned at the first side 101 and extends laterally across the opening 103. The first end 31 of the body 30 is aligned with the second side 102 of the panel 100. Likewise, the edge of the insert 50 that is positioned in the body 30 is aligned with the first end 31 and the second side 102.

Figure 5:
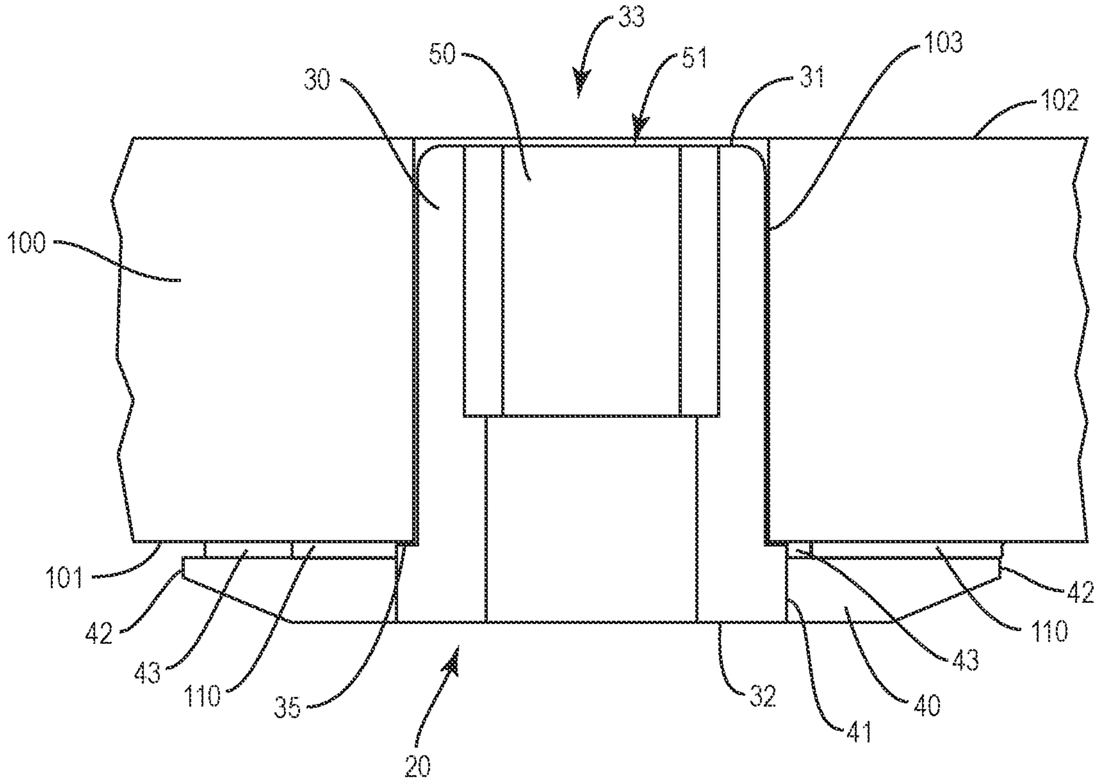
FIG. 5 is a schematic side view of a fastener connected within an opening in a panel.

FIG. 5 illustrates a side view of the fastener 20 connected to the panel 100. The flange 40 extends along the first side 101 laterally outward beyond the opening 103. This sizing prevents the body 30 from being pulled through the opening 103. Stand-offs 43 on the flange 40 contact against the first side 101 of the panel 100 and space the top edge of the flange 40 outward away from the first side 101. This provides space for the adhesive 110 to be positioned between the flange 40 and the first side 101. The body 30 is positioned in the opening 41 in the flange 40 and the second end 32 of the body 30 is aligned with the bottom of the flange 40.

The body 30 extends within the opening 103. The first end 31 is positioned in proximity to the second side 102. The insert 50 is mounted in the opening 33 at the first end 31. The opening 51 in the insert 50 is exposed to receive an item (not illustrated).

During mounting, the adhesive 110 is positioned between the flange 40 and the first side 101. In some examples, the adhesive 110 is positioned on the flange 40 prior to the body 30 being inserted into the opening 103. Additionally or alternatively, the adhesive 110 is inserted into the space formed between the flange 40 and first side 101 after the body 30 is inserted into the opening 103. In some examples, the adhesive 110 is applied to just the flange 40 and not to the body 30.

After the fastener 20 is positioned in the panel 100, UV light is applied through the flange 40 to the adhesive 110. The material of the flange 40 provides for the UV light to pass through to the adhesive 110. The UV light is applied for the necessary time to cure the adhesive 110. The UV light does not affect the body 30 and thus the body 30 maintains its structural characteristics.

In some examples, the flange 40 may fail. This can be caused by various reasons, including but not limited to being melted by a high temperature event such as a fire, and being torn from the body 30 during use. The lip 35 on the flange 35 has a width W2 that is larger than the width of the opening 103 in the panel 100. This difference in widths is seen best in FIG. 5. The lip 35 contacts against the first side 101 of the panel 100 and prevents the body 30 from being pulled through the opening 103.

Figure 6:
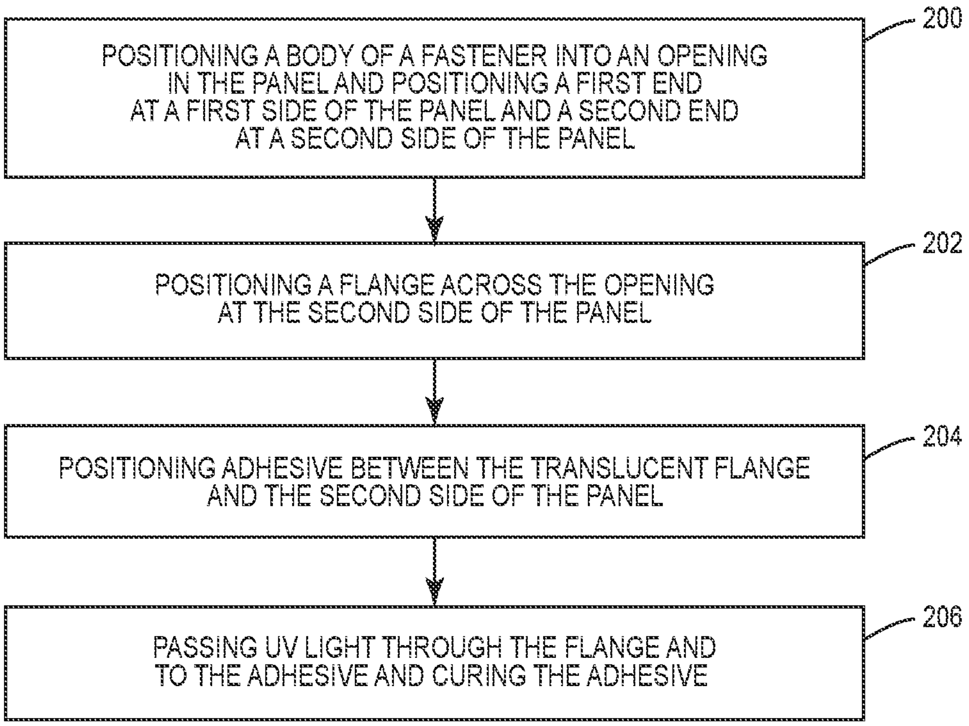
FIG. 6 is a flowchart diagram of a method of attaching a fastener to a panel.

FIG. 6 illustrates a method of attaching a fastener 20 to a panel 100. The body 30 that is opaque is positioned into an opening 103 in the panel 100 (block 200). A first end 31 of the body 30 is positioned at a first side 101 of the panel 100 and a second end 32 of the body 30 is positioned at an opposing second side 102 of the panel 100. A translucent flange 40 that is connected to the second end 32 of the opaque body 30 is positioned across the opening 103 at the second side 102 of the panel 100 (block 202). Adhesive 110 is positioned between the translucent flange 40 and the second side of the panel 100 (block 204). The fastener 20 is secured to the panel 100 by passing UV light through the translucent flange 40 and to the adhesive 110 and curing the adhesive 110 (block 206).

The opening 33 extends into the body 30 from the first end 31. In some examples, the opening 33 extends completely through the body 30. A through opening 33 accommodates a full length insert 50 that is threaded at both ends. A first item 200 can be threaded onto the first end and a second item can be attached from the flange side utilizing the threads at the second end.

A variety of items 200 can be connected to the fastener 20. Examples include but are not limited to bolts, screws, pins, wiring support brackets, magazine racks, mating panels, environmental control ducting and features, electronic boxes, and video monitors.

The panel 100 can be constructed from various materials. In some examples, the panel 100 is a composite material.

In some examples, the fastener 20 includes an insert 50 mounted in the body 30. In other examples, the fastener 20 does not include an insert. Rather, the opening 33 in the body 30 is configured to receive the item 200. In some examples, the opening 33 is threaded to connect to the item.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A fastener configured to be attached to a panel with an adhesive and to support an item, the fastener comprising:

a body constructed from a first material, the body comprising:

a main section with a cylindrical shape and comprising a first end and a second end;

an opening that extends into the main section of the body at the first end, the main section of the body comprising a centerline that extends along the opening;

a lip positioned at the second end of the main section, the lip extends outward from the main section and has a greater width than the main section, the lip further comprising a flat surface;

a flange constructed from a second material and comprising an inner side configured to face towards the panel and an opposing outer side configured to face away from the panel, the flange connected to the body and sized to extend laterally outward beyond the body to position the adhesive laterally outward beyond the body;

stand-off members connected to the inner side of the flange and being spaced laterally outward away from the body, the stand-off members comprising flat surfaces positioned outward along the centerline beyond the inner side to provide spacing for the adhesive when the flange is positioned at the panel; and wherein the lip extends outward beyond the inner side of the flange such that the flat surfaces of the lip and the stand-off members contact against the panel;

wherein the first material comprises a lower transmissibility of UV light than the second material.

2. The fastener of claim 1, wherein the flange is connected to the second end of the body and is spaced away from the first end of the body.

3. The fastener of claim 1, wherein the flange comprises a central opening and the body is positioned within the central opening.

4. The fastener of claim 1, further comprising an insert positioned within the opening of the body at the first end, the insert constructed from a third material that is different from the first material and the second material.

5. The fastener of claim 4, wherein the body comprises a first groove and a second groove that are aligned along the main section on opposing sides of the opening to crimp the body, each of the grooves extending around a limited portion of the main section.

6. The fastener of claim 1,
wherein the lip extends outward along the centerline beyond the inner side of the flange.

7. The fastener of claim 1, wherein the opening in the body extends completely through the body.

8. The fastener of claim 1, wherein the flange is substantially translucent to accommodate transmission of the UV light and the body is opaque.

9. The fastener of claim 1, wherein the stand-off members are discrete members that are spaced apart along an outer edge of the flange.

10. The fastener of claim 1, wherein the main section of the body has a circular sectional shape and the lip has a continuous edge with a non-circular shape.

11. A fastener configured to be attached to a panel with an adhesive and to support an item, the fastener comprising:
a body comprising:
a first end;
a second end;
an opening that extends through the body from the first end to the second end and with a centerline aligned along the opening;
a lip positioned at the second end, the lip comprising a flat surface and having a greater width than a remainder of the body;
a flange positioned at the second end of the body and comprising a width that is greater than the body with the flange extending laterally outward beyond the body;
stand-off members that extend outward beyond an inner side of the flange along the centerline, the stand-off members comprising flat surfaces configured to contact against the panel and space the flange away from the panel to accommodate the adhesive that is positioned along the flange;
wherein the lip extends outward beyond the inner side of the flange such that the flat surfaces of the lip and the stand-off members contact against the panel and space the flange away from the panel;
wherein the body has a lower transmissibility of UV light than the flange.

12. The fastener of claim 11, wherein the flange is translucent and the body is opaque.

13. The fastener of claim 11, wherein the body comprises a main section with a cylindrical shape and the flange comprises a disc shape.

14. The fastener of claim 13, wherein the flange extends completely around the main section of the body.

15. The fastener of claim 11, wherein the flange comprises a central opening and the second end of the body is positioned within the central opening.

16. The fastener of claim 11, further comprising an insert positioned within the opening in the body, the insert constructed from a different material than each of the body and the flange.

17. A method of attaching a fastener to a panel, the method comprising:
positioning the fastener into an opening in the panel, said fastener comprising:
an opaque body comprising a first end, a second end, and an opening that extends through the opaque body from the first end to the second end;
a translucent flange positioned at the second end, said translucent flange comprising a width that is greater than the opaque body at the second end with the flange extending laterally outward beyond the opaque body second end; and
wherein the opaque body has a lower transmissibility of UV light than the flange;
positioning the translucent flange across the opening at a second side of the panel, the translucent flange connected to the second end of the opaque body;
contacting flat surfaces of stand-off members that extend outward from the flange against the second side of the panel and creating a gap between the flange and the second side of the panel;
contacting a flat surface of a lip that extends around a main section of the body against the second side of the panel;
positioning adhesive in the gap between the translucent flange and the second side of the panel; and
securing the fastener to the panel by passing UV light through the translucent flange and to the adhesive and curing the adhesive.

18. The method of claim 17, further comprising applying the adhesive to the translucent flange prior to positioning the translucent flange across the second side of the panel.

19. The method of claim 17, further comprising aligning a first end of the opaque body with a first side of the panel.

20. The method of claim 17, further comprising applying the adhesive to just the translucent flange and not the opaque body.

* * * * *